E. W. ZEH.
POWER PRESS.
APPLICATION FILED JUNE 27, 1917.

1,324,367.

Patented Dec. 9, 1919.
5 SHEETS—SHEET 1.

WITNESS:
Howard P. King

INVENTOR:
Edmund W. Zeh,
BY
Marble & Everett,
ATTORNEYS.

E. W. ZEH.
POWER PRESS.
APPLICATION FILED JUNE 27, 1917.

1,324,367.

Patented Dec. 9, 1919.
5 SHEETS—SHEET 2.

WITNESS:
Howard P. King

INVENTOR:
Edmund W. Zeh,
BY
Marble & Everett,
ATTORNEYS.

E. W. ZEH.
POWER PRESS.
APPLICATION FILED JUNE 27, 1917.
1,324,367.
Patented Dec. 9, 1919.
5 SHEETS—SHEET 3.
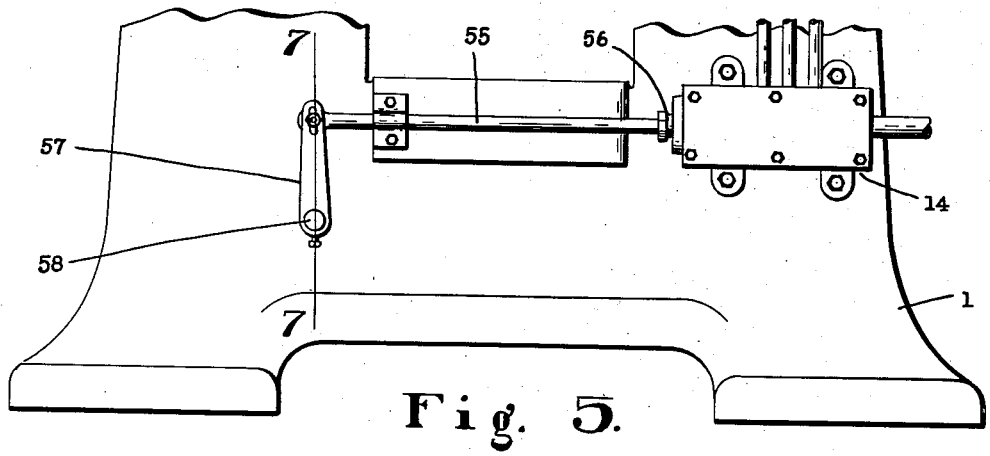
Fig. 5.
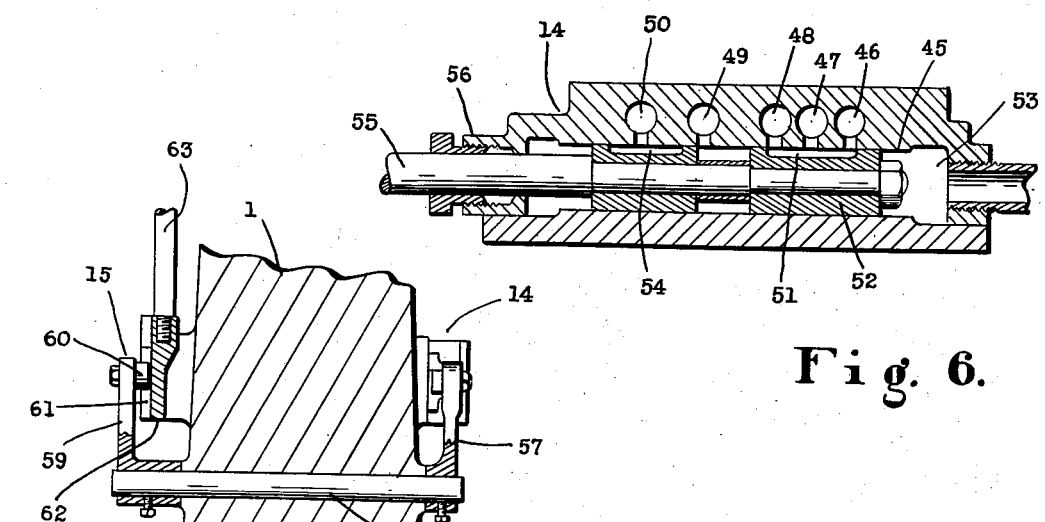
Fig. 6.
Fig. 7.
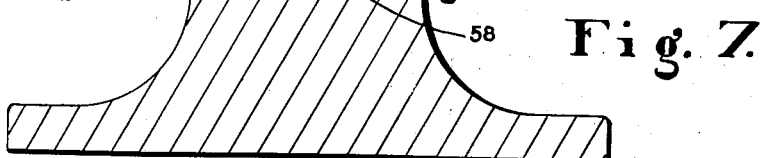
Fig. 8.
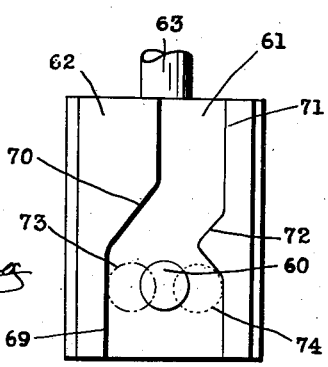
WITNESS:
Howard P. King
INVENTOR:
Edmund W. Zeh,
BY
Marble & Everett,
ATTORNEYS.

E. W. ZEH.
POWER PRESS.
APPLICATION FILED JUNE 27, 1917.

1,324,367.

Patented Dec. 9, 1919.
5 SHEETS—SHEET 4.

WITNESS:
Howard P. King

INVENTOR:
Edmund W. Zeh,
BY
Marble & Everett,
ATTORNEYS.

E. W. ZEH.
POWER PRESS.
APPLICATION FILED JUNE 27, 1917.

1,324,367.

Patented Dec. 9, 1919.
5 SHEETS—SHEET 5.

WITNESS
Howard P. King.

INVENTOR:
Edmund W. Zeh,
BY
Marble & Everett,
ATTORNEYS.

UNITED STATES PATENT OFFICE.

EDMUND W. ZEH, OF NEWARK, NEW JERSEY.

POWER-PRESS.

1,324,367. Specification of Letters Patent. Patented Dec. 9, 1919.

Application filed June 27, 1917. Serial No. 177,164.

*To all whom it may concern:*

Be it known that I, EDMUND W. ZEH, a citizen of the United States of America, and a resident of Newark, in the county of Essex and State of New Jersey, have invented new and useful Improvements in Power-Presses, of which the following is a specification.

This invention relates more especially to fluid pressure controls, such as pneumatic, hydraulic, etc., which actuate clutch mechanisms for starting and stopping the movable die-carrying members or hammers of power presses, and which may also operate upon brakes for positively stopping said movable members. The invention is particularly advantageous when applied to large sizes of screw presses, wherein opposite driving disks are moved into and out of engagement with a friction wheel, said disks being heavy and better controlled by the operator through fluid pressure than by mechanical hand means.

The objects of the invention are to provide a control by which the drive disks can be shifted to release the elevating drive disk and then overcome the momentum of the friction wheel, screw and hammer to bring them to rest; to thus avoid the wear of applying a brake while the elevating disk is still in contact, as has been common heretofore; to control the brake by pneumatic pressure, so that it can be released before the lowering drive disk is applied; to release the brake by exhausting the fluid pressure from behind it; to enable such release and application of the lowering disk to be performed automatically in proper sequence; to enable the fluid pressure to be automatically reestablished behind the brake; to effect such reestablishment of pressure in proper sequence with the application of the elevating drive disk; to thus enable all the operations of the drive disks and brake to be controlled automatically and simply in proper sequence; to provide such a control which may be manipulated by the operator in the usual manner of manually operating the press; to prevent inadvertent failure of the fluid pressure causing the friction wheel to lower; to provide an improved valve for effecting the desired control of the fluid pressure; to enable the hammer to be reversed during its downward stroke if desired without interfering with its automatic operation at the ends of such stroke; to safeguard against falling of the friction wheel in case of the screw breaking to secure an improved slidable mounting of the hammer, and to secure other advantages and results as may be brought out in the following description.

Referring to the accompanying drawings, in which like numerals of reference indicate the same parts throughout the several views, Figure 1 is a perspective view of a power press embodying my invention;

Fig. 5 is a rear view of the lower portion of the press showing the valve mounted thereon for controlling the fluid pressure;

Fig. 6 is a central longitudinal section of the valve;

Fig. 7 is a vertical section through the frame of the press on line 7—7 of Fig. 5;

Fig. 8 is a front elevation of the controlling cam for automatically operating said valve;

Figure 1:
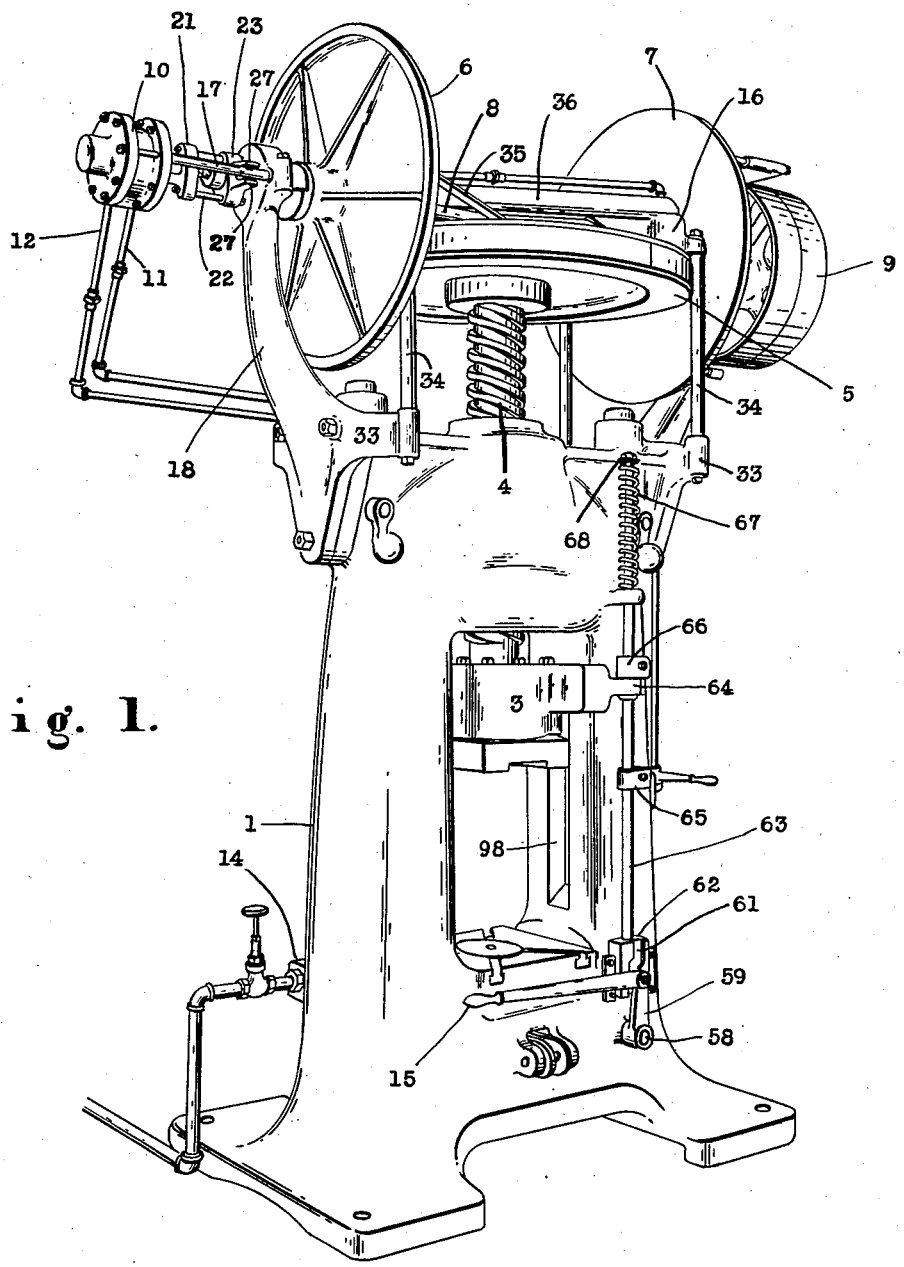
Figure 2:
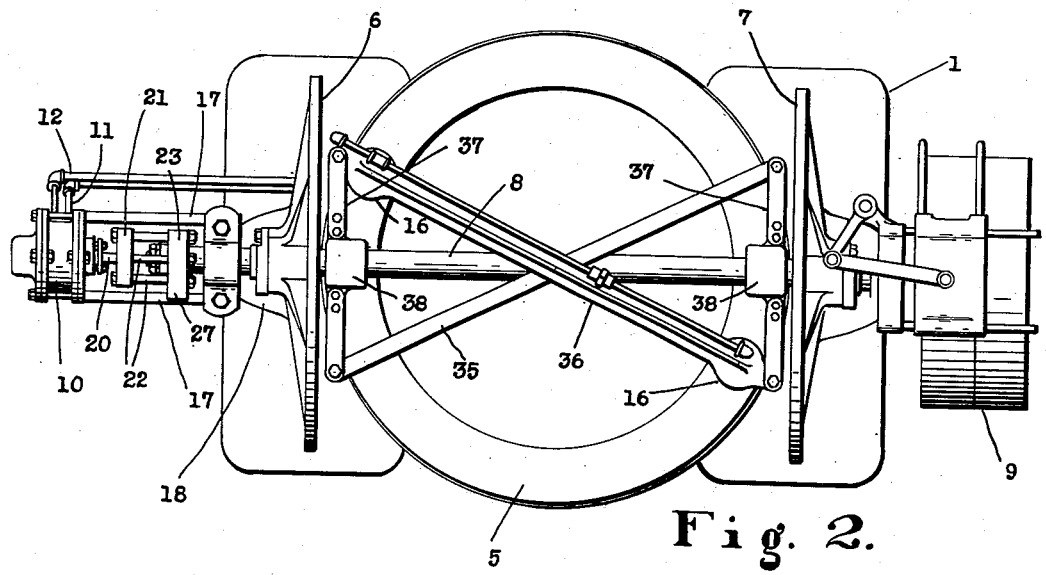
Fig. 2 is a plan of the same.
Figure 3:
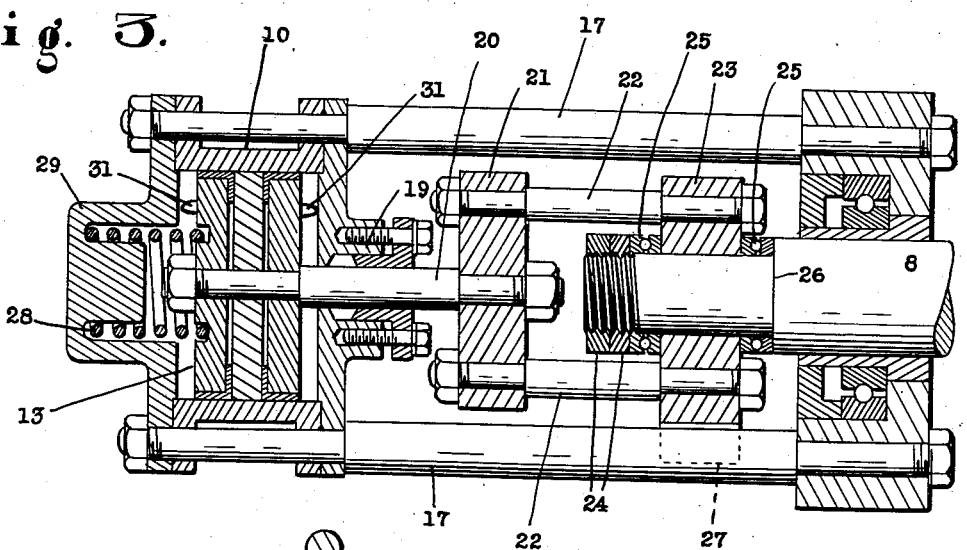
Fig. 3 is a horizontal longitudinal section in the plane of the drive disk shaft at one end thereof showing the means for sliding said shaft.

In the specific embodiment of the invention illustrated in said drawings, the reference numeral 1 indicates the frame of a press which is centrally open, providing a vertical slideway for a head or hammer 3 carried upon the lower end of a screw 4 which works through the top of said horizontal wheel 5 providing at its periphery a friction surface. This friction wheel has at diametrically opposite sides of itself vertical driving disks 6, 7 upon a driving shaft 8 which carries belt pulleys 9 and is slidable longitudinally to carry the driving disks into and out of engagement with the friction wheel.

Preferably at the opposite end of the shaft 8 from the driving pulleys, suitable means are provided for sliding the shaft, said means including a cylinder 10 into either end of which fluid pressure may be introduced through suitable pipes 11, 12 to operate upon one side or the other of a piston 13 within the cylinder, suitable means, subsequently described connecting said piston with the shaft 8 so as to slide said shaft when the piston is moved by the fluid pressure. A suitable valve 14, shown situated for convenience at the back of the press, is provided for controlling the admission and exhaust of the fluid pressure to said cylinder. This valve is operated through suitable connections from a lever 15 at the front of the press so that swinging the lever in one direction will admit the fluid pressure to the end of the cylinder which will slide the lowering disk 7 into engagement with the horizontal friction wheel 5. Thereupon, the friction wheel and hammer are lowered, and by automatic means provided for the purpose, the valve 14 is shifted at the proper time to exhaust the fluid pressure from that end of the cylinder and admit pressure to the other end, as a result of which the drive disks will be shifted and the raising disk 6 will engage the friction wheel 5 and raise the hammer. As the hammer approaches its upper position it automatically operates the valve to initial or neutral position.

Also operated from said valve are fluid controlled brakes 16, 16 above the friction wheel for stopping the same as it comes to its upper position, and for positively holding it until the operating lever is swung again to start the press, at which time the fluid pressure is released from the brakes so that the wheel is free to start rotating. It is to be particularly noted that as the friction wheel approaches its uppermost position, the raising drive disk is first removed from contact therewith, and then the brakes are caused to engage said wheel. In this way, the driving means and brake means are not both acting upon the friction wheel at the same time, but act in proper sequence. That is to say, in raising the drive disk is first released from the friction wheel, so that power is no longer being applied to drive it, and then the brake means act upon the friction wheel to overcome its momentum and bring it to rest. Obviously in this way there can be a great saving of power and wear upon the parts, since the elevating means can be released at the proper moment so that the upwardly moving friction wheel and associated parts can be stopped by the brake means with minimum loss of energy.

While the invention, as above generally described, may be embodied in practice to suit various conditions and changes in construction within the scope of mechanical skill, I have shown, for illustrative purposes, the various parts in detail as I have used them to make a complete and operable press, which will be next described, but it is to be understood that I do not restrict myself to these structural details.

Referring to Sheets 1 and 2 of the drawings, the particular shift means shown for sliding the shaft 8, provides in connection with the cylinder 10, stays 17, 17 extending from the adjacent arm 18 in which said shaft is journaled, outwardly to said cylinder, holding the same in axial alinement with the shaft. Extending from the piston 13 through a suitable stuffing box 19 in the end wall of the cylinder toward the shaft, is a piston rod 20 the end of which away from the piston is secured substantially at the middle of a yoke 21. Near the outside of said yoke, are suitable studs or other connecting members 22 extending substantially parallel to the piston rod 20 and shaft 8 preferably upon diametrically opposite sides of said shaft. Another yoke 23 is mounted adjacent the end of said shaft and prevented from longitudinal displacement therefrom by suitable lock nuts 24, 24. For reducing friction, thrust ball bearings 25, 25 are positioned upon the shaft at opposite sides of said yoke 23, one of said ball bearings being included between the yoke and a shoulder 26 on the shaft and the other one included between the yoke and said lock nuts. The studs or bolts 22 are secured also to this yoke 23, and it will be obvious that by this means the shaft will be moved longitudinally when said piston is moved. Preferably, the yoke 23 is prevented from rotating with the shaft by lips 27, 27, at one side of itself which overlie one of the stays 17.

Means are preferably provided for normally sliding the shaft 8 so the raising disk will engage the friction wheel and prevent the same from lowering upon failure of the fluid pressure, and this means I have shown herein as a spring 28 between the outer end of the piston and the cylinder head 29. It being desirable to keep the space within the cylinder at the ends of the piston as small as possible, so as to not require large volumes of fluid, the spring is positioned within a pocket 30 of suitable dimensions formed in the end of the cylinder. Openings 31, 31 are provided adjacent each end of the cylinder through which the fluid pressure may be introduced or exhausted from the pipes 11, 12, it being understood that when fluid pressure is introduced at one end of the cylinder fluid is exhausted from the other end of the cylinder, this being accomplished by means of the valve 14 to which said pipes are connected.

Extending upright from the top of the frame of the press, preferably supported by suitable branches 33, of the arms in which the shaft 8 is journaled, are rods 34 or the like the upper ends of which are secured in place by stays 35, 36, extending diametrically with respect to the friction wheel, said stays crossing each other and preferably being positioned above the shaft 8 and the friction wheel 5. The rods 34 are also connected at their upper ends by means of chordal stays 37, 37 transverse to the shaft 8, and having bearings 38, 38 through which the shaft extends and by means of which the rods are held positively against lateral displacement. Preferably, the distances parallel to the shaft and perpendicular to the shaft between opposite rods are less than the diameter of the friction wheel, as a result of which the friction wheel cannot move laterally from between said rods, and therefore, in case of the screw 4 breaking, the friction wheel will not fall to the floor.

Figure 4:
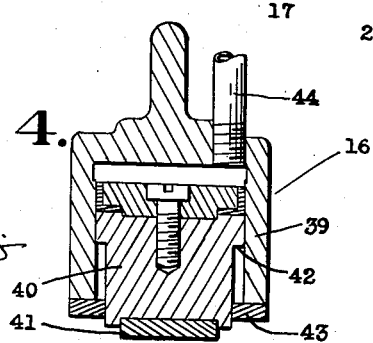
Fig. 4 is a vertical section through one of the brakes above the friction wheel.

One of the diametric stays connecting the upper ends of the rods, as 36, provides brakes 16, 16 for stopping upward movement of the friction wheel. These brakes, as shown in Fig. 4, preferably comprise each a downwardly open cylinder 39 integral with the stay and in which a plunger or head 40 forming the brake proper is slidably mounted, said head having a facing 41 at its lower end for engaging the friction wheel to stop it. The lower part of the plunger or head 40 is of less diameter than the upper part, thereby forming a shoulder 42 which faces downwardly and which will engage a ring 43 secured to the bottom of said cylinder for limiting downward movement of said head. A pipe 44 leading from the valve 14 enters the top of said cylinder for introducing fluid pressure above the piston or exhausting it. The valve is so timed in relation to the operation of the various parts, that the fluid pressure is introduced above the brake head as the friction wheel comes up so the said head will be projected toward the friction wheel and meet it as it comes up. Timing of the valve is also such that the raising drive disk is shifted out of contact with the friction wheel before the brake acts thereupon, so the friction wheel is not being driven and stopped at the same time.

Referring to Figs. 5 to 8, I have shown one means of control for the fluid pressure in which a D-slide valve is used. The valve seat 45 is preferably provided with five ports, a group of three of which 46, 47 and 48 control the admission and exhaust of the fluid pressure to the disk shifting cylinder, while the other two, 49 and 50, control the admission and exhaust of the fluid pressure for the brake. These ports are so arranged, that with the friction wheel at the upper end of its stroke in idle position, the group of three ports controlling the shifting of the disks are all beneath the groove 51 of the slidable member 52 of the valve, as a result of which the fluid pressure is exhausted from both sides of the cylinder. At this time, the port 49 to the brake is in communication with the pressure chamber 53 of the valve so that pressure is admitted throughout to the brake cylinder. For starting the press, the slide valve is moved to cover the port 49 to the brake cylinder and the port 48 connected to the lowering end of the shifting cylinder, that is, the end of the cylinder to which pressure has to be applied for sliding the lowering disk into engagement with the friction wheel. Continued movement of the slidable member of the valve opens the port 49 to the brake cylinder beneath a groove 54 in the slidable member and beneath which the exhaust port 50 also opens. The fluid pressure is thereby exhausted from the brake cylinder, releasing the friction wheel so that it may rotate freely. Preferably, this action takes place slightly in advance of sliding the lowering disk into contact with said wheel, such sliding being obtained by the slidable member of the valve passing from over the port 48 and admitting pressure from the pressure chamber to the lowering end of the shifting cylinder. At the lower end of the stroke of the hammer and friction wheel the slidable member of the valve is moved to the opposite end of its seat, exhausting the fluid pressure from the shifting cylinder and placing the opposite or raising end of the cylinder in communication with the pressure through the port 46 thus shifting the raising disk into contact with the friction wheel. At the same time the port 49 to the brake is opened to the pressure chamber and causes the brake head to project and engage the friction wheel as it reaches the upper end of its stroke. However, before said wheel actually engages the brake, the slidable valve member is preferably shifted to initial or idle position so as to relieve the pressure from the shifting cylinder and not hold the drive disks in contact with the friction wheel, pressure being maintained in the brake cylinder only.

For shifting the slide valve, the same is secured to a slide rod 55 which extends in the direction of movement of the said valve, passing from the pressure chamber through a suitable stuffing box 56 and being connected at its outer end in any suitable manner to a free end of a crank arm 57. This crank arm is secured upon a stud shaft 58 extending through the frame of the press to the front thereof, and upon the front end of said shaft is another arm 59 having a roller 60 at its free end. This roller projects into the groove 61 of a cam 62 which is preferably slidable in a direction parallel to the movement of the hammer, and operated automatically from the hammer for reversing and shutting off the application of power to the friction wheel at the proper time. As shown, this arm 59 which is operated by the cam is preferably integral with the lever 15 by means of which the said arm and stud shaft 58 may be manually operated, and by preferance the parts are so arranged and related that pressing down upon this lever will shift the slide valve in the proper direction for causing the fluid pressure to engage the lowering disk with the friction wheel. The cam 62 is preferably fast upon the lower end of a vertically positioned slide rod 63 movable in a direction parallel to the hammer and adjacent said hammer whereby a lug 64 on the hammer may engage suitable dogs 65, 66 adjustably secured upon said rod. It is to be understood, that the hammer in its movement up and down, engages the said dogs only at the ends of its strokes, that is, engages the lower dog 65 at the lower end of its stroke and engages the upper dog 66 at the upper end of its stroke, the hammer having sufficient movement after it engages the dog for sliding the rod and cam the necessary distance for operating the arm 59 and slide valve. Means, such as a spring 67 are preferably provided for retaining the slide rod in whatever position to which it is moved, that is, for counteracting the weight of the rod, said spring being shown as resting at its lower end upon one of the guides for the rod and holding the rod raised against its own weight by engaging under a suitable cap 68 on the upper end of the rod. This spring is not strong enough to lift the rod, when it is lowered by the hammer, but is strong enough to hold it raised when the hammer lifts the rod.

Upon swinging the lever 15 manually for starting the press, the roller 60 is moved to one longitudinal or vertical side wall 69 of the groove 61 of the cam where it remains until the hammer approaches the lower end of its stroke when the cam is slid downwardly and an inwardly sloping wall 70 of said cam groove 61 engages said roller and pushes it over to the other longitudinal wall 71 of said groove. This operation upon the roller obviously swings the supporting arm 59 therefor and shifts the slide valve to reverse the direction of movement of the hammer. As the hammer approaches the upper end of its stroke the cam 62 is raised by the lower dog 65, at which time a projection 72 from the vertical wall 71 of said cam groove engages the roller and returns it to its middle or initial position. It is to be noted, that the cam 62 remains idle during the down stroke of the hammer, and the lower portion of the groove 61 is wide enough so the arm 59 may be swung in either direction from its idle position, so that after the press is started and the hammer begins to lower, if desired the operator can swing the arm to its other position and thereby reverse the direction of movement of the hammer before it has struck its blow. This is shown, diagrammatically in Fig. 8 wherein the idle position of the roller 60 is indicated in solid lines, the position of the roller during down stroke of the hammer is shown in dot and dish lines 73 and the position of the roller for raising the hammer after it has struck its blow is shown in dotted lines 74. While the above described slide valve and cam for operating the same are both simple and efficient I do not wish to be understood as restricting myself to a longitudinally slidable valve nor to the specific cam for operating the same, as they may be varied as may be found necessary or desirable.

Figure 9:
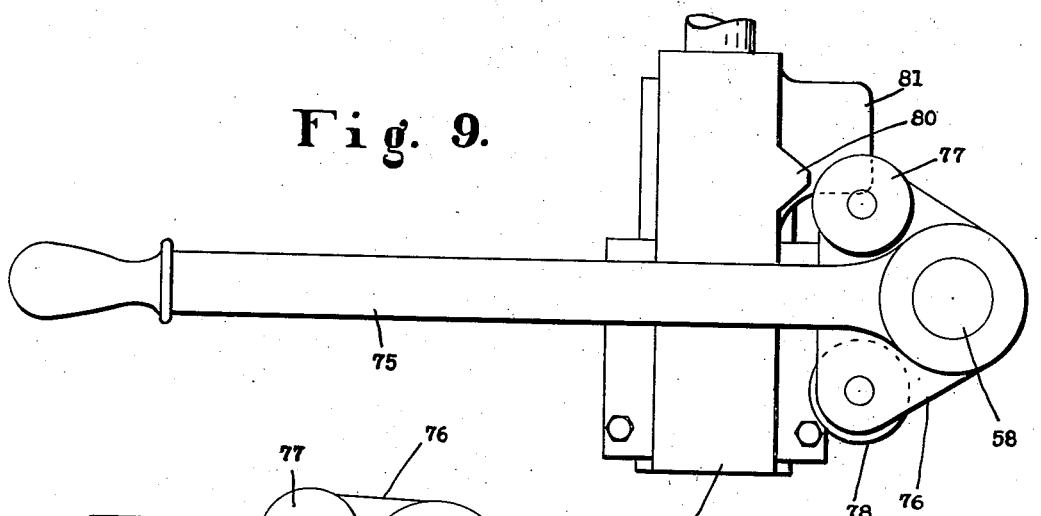
Fig. 9 is a front elevation of a modified construction of cam and valve-operating means, showing the same in normal or idle position of the press.
Figure 10:
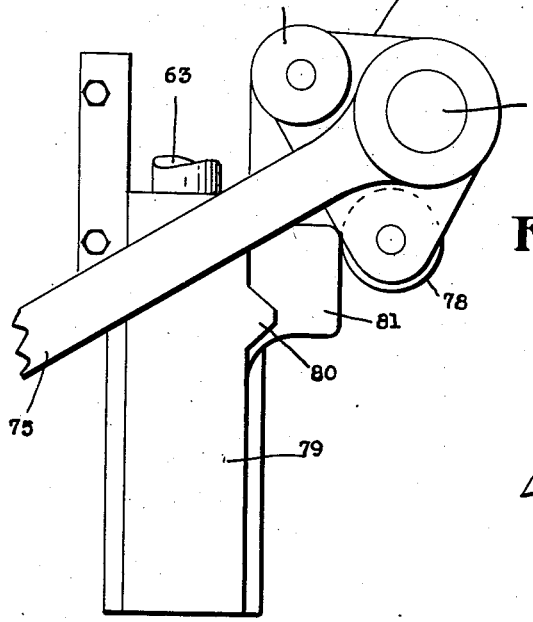
Fig. 10 is a similar front elevation showing the parts in the position which they assume to reverse the direction of movement of the hammer when it reaches its lower position.
Figure 11:
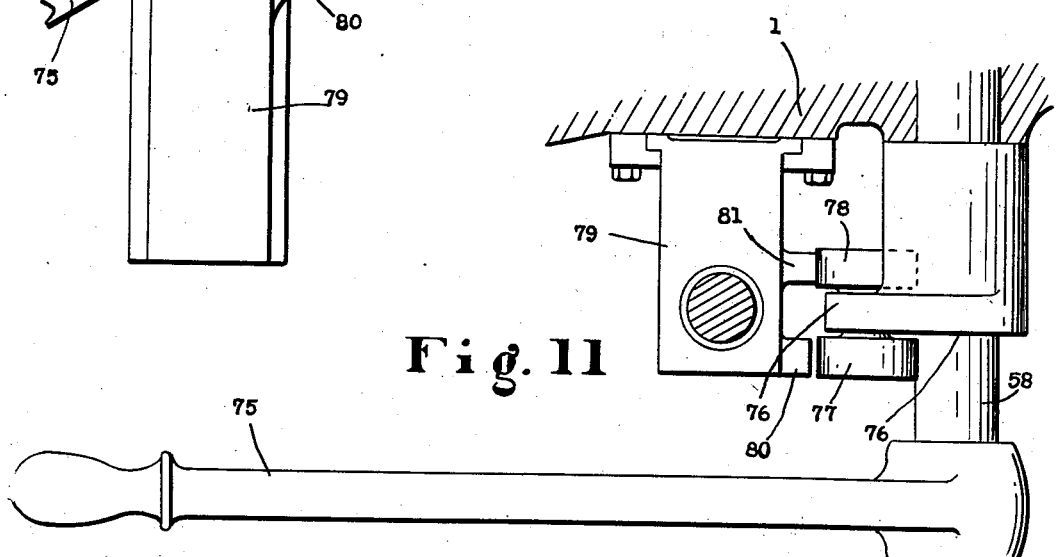
Fig. 11 is a section taken above the cam and lever of said modified construction looking down upon the same.
Figure 12:
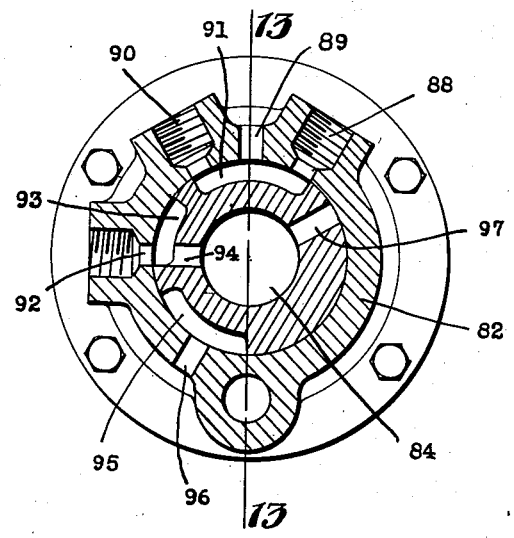
Fig. 12 is a section on line 12—12 of Fig. 13, showing a certain rotary valve for use in connection with the modified cam and lever of Figs. 9–11.
Figure 13:
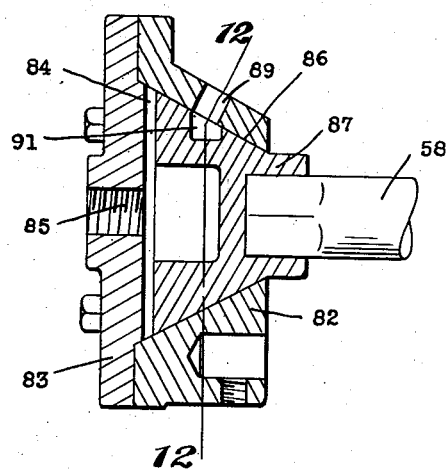
Fig. 13 is a sectional view on line 13—13 of Fig. 12.

In Figs. 9 to 13 a rotary valve is provided instead of a slide valve and modified means are shown for rotating said valve through a greater angularity than can be efficiently obtained by the preferred construction of cam above described. This modified construction of valve operating means, shown particularly in Figs. 9–11, provides upon the outer end of the stud shaft 58 which extends through the frame 1 of the press a lever 75 for rotating said shaft manually. Also upon the end of the shaft 58 in front of the frame of the press is an arm 76, shown as substantially triangular in shape and having rollers 77 and 78 upon its front and rear sides respectively. Preferably these rollers are positioned at two corners of the triangularly shaped arm and the shaft 58 passes through the other corner, and furthermore, the roller 77 on the front of the arm is at a corner above the corner supporting the roller 78 on the back of the arm. A cam 79 is positioned adjacent the arm 76 and provided with projections 80 and 81 for engaging the upper and lower rollers respectively. The cam 79 is fast upon the lower end of a slide rod 63 and is moved up and down thereby as was described in connection with the preferred construction. For operating the valve and starting the press, the lever 75 is raised, swinging the lower roller toward the cam. When the cam is slid downward by the hammer the projection 81 thereon engages the lower roller 78 swinging the arm 76 and rotating the shaft 58. It is to be noted, that the projection 81 which thus swings the arm 76 projects farther from the body portion of the cam 79 than the other projection 80 so as to swing the arm 76 past the neutral position which it was in before being manually raised, as a result of which the lever 75 is swung downward and the hammer is raised. As the hammer approaches the upper end of its stroke the cam 79 is raised to its initial position whereupon the smaller projection 80 engages the front roller 77 swinging the arm 76 back to initial or neutral position and stopping the press. It is to be noted, that a considerable rotation of the shaft 58 is obtained by this means, which is necessary and desirable in connection with the rotary valve next to be described. Also, it will be noted, that the cam 79 does not move downward except at the very last of the down stroke of the hammer and that the lever 75 may be manually swung down to reverse the movement of the hammer before it strikes its blow, if desired.

The rotary valve which I prefer, and which is adapted to be used in connection with the operating means above described, comprises a casing 82 adapted to be closed at its outer side by a cap 83 and provide a pressure chamber 84 within itself to which pressure may be supplied through a suitable opening 85 in the cap. Preferably a conical or frusto-conical valve seat 86 is provided within the casing 82, the same being shown as of greatest diameter toward the cap and of smaller diameter toward the press. A rotary valve member 87 is provided within the casing having a frusto-conical shape corresponding to that of the seat, and preferably this valve member 87 is upon the opposite end of the stud shaft 58 from the lever 75 so that rotation of said shaft obtains a direct and equal rotation of the rotary valve, but obviously this could be varied in any manner found desirable.

Ports 88 and 90 are provided through the wall of the casing which are connected by the piping as described in the preferred construction to the opposite ends of the cylinder for shifting the disks, and between said ports 88 and 90 is an exhaust port 89 opening through the casing to the atmosphere. A groove 91 in the wall of the rotatable valve member 87 is adapted to register with and control the fluid pressure for the ports 88, 89 and 90. Another port 92 is provided in said casing adapted to be connected to the brake above the friction wheel for controlling the admission and exhaust of pressure therefor. A groove 93 in the outer wall of the valve member is adapted to register with this port 92 in the position to which the valve is turned when the hammer starts to raise and after it rotates the valve to normal position. This groove 93 is in communication with the pressure chamber 84 by an opening 94 through the wall of the valve member so that while the groove is in registration with the port 92 pressure will be supplied to the brake cylinder. Preferably the parts are so related that rotating the valve member to start the press causes the port 92 to be first covered and then opened to another groove 95 in communication with the atmosphere through an exhaust port 96, thus exhausting the fluid from the brake cylinder. This movement of the valve member also causes the groove 93 which was previously in communication with the brake cylinder port 92 to come into communication with the port 90 to the lowering end of the shift cylinder 10, the groove 91 formerly in registration therewith remaining in communication with the other two ports 88 and 89 so the opposite end of the cylinder is open to the atmosphere. When the hammer reaches the lower end of its stroke, and the valve member 87 is rotated to its other extreme position, an opening 97 through the wall of the valve member from the pressure chamber 84 comes into registration with the port 88 to the raising side of the cylinder, and at the same time the groove 91 registers with the port 90 from the lowering side of the cylinder and with the exhaust port 89, as the result of which the disks are shifted and the hammer raised. Also, in this extreme position of the valve member 87 the groove 95 passes out of registration with the port 92 to the brake thus cutting off its exhaust to the atmosphere, and the groove 93 passes back into registration with the said port 92 thus supplying pressure to the brake and projecting the brake head. Return of the valve member to initial or idle position places both the ports 88 and 90 from the shifting cylinder in communication with the atmosphere through the exhaust port 89 by way of the groove 91, but the port 92 to the brake, still remains in communication with the pressure chamber so that the brake is set while the press stands idle. Obviously in this construction, as in the preferred valve construction, the release of the raising disk from the horizontal disk and the application of the brake occur in proper sequence, so as not to be driving the friction wheel and stopping it at the same time.

Figure 14:
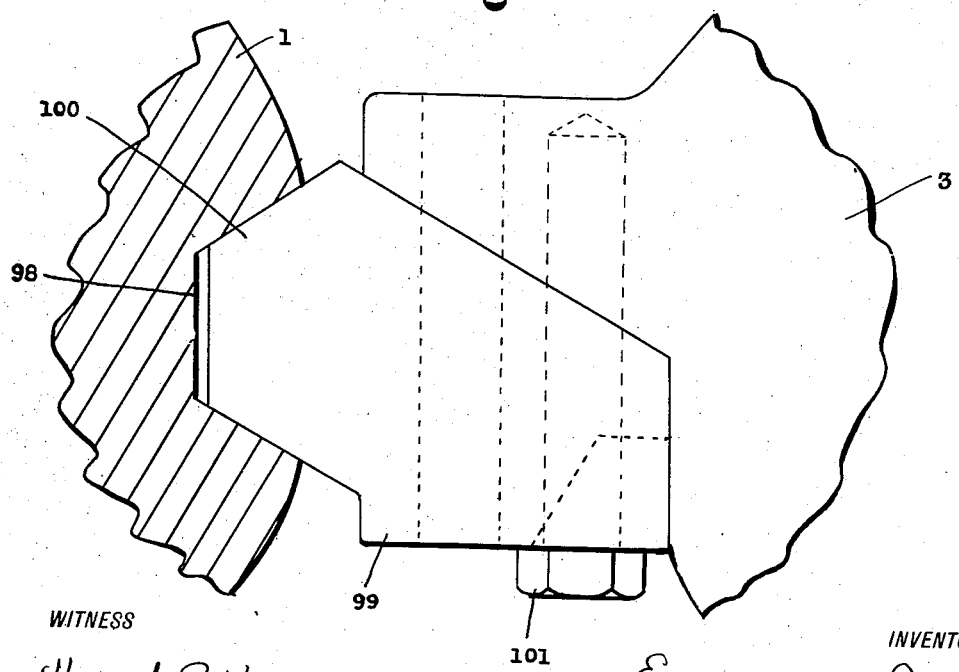
Fig. 14 is a section of a portion of the frame of the press adjacent the slideway for the hammer, showing a portion of the hammer in plan.

As a further feature of my invention, I preferably provide a female gib for guiding the hammer in its longitudinal sliding movement, and as shown in the drawings (see Figs. 1 and 14) grooves 98, 98 are provided in the frame of the press at opposite sides of the hammer, and suitable tongues extend from the hammer into said grooves for guiding it longitudinally. One or both of these guides, must obviously be removable in order to mount the hammer within the central opening of the press, and as shown in Fig. 14 a removable block 99 is provided having a tongue 100 projecting into the groove 98, said block being secured to the body portion of the hammer 3 in any suitable manner as by bolts 101. By this construction, the gibs form no obstruction in the central opening of the press, and the upper and lower dies may both be made one as large as the other and substantially the full width of the opening of the central opening of the press.

Obviously detail modifications and changes may be made in manufacturing my improved power press without departing from the spirit and scope of the invention, and I do not wish to be understood as limiting myself except as required by the following claims when construed in the light of the prior art.

Having thus described the invention, what I claim is:

1. In a press of the character described, the combination with a friction wheel, driving disks therefor, and a brake for retarding upward movement of the friction wheel, of means for disengaging the driving disks from the friction wheel in advance of applying said brake.

2. In a press of the character described, the combination with a friction wheel, driving disks therefor, and a brake for retarding upward movement of the friction wheel, of means for first disengaging the driving disks from the friction wheel and then applying the brake to overcome the momentum of the friction wheel and parts moving with it.

3. In a press of the character described, the combination with a friction wheel, driving disks therefor, and a brake for retarding upward movement of the friction wheel, of means for automatically disengaging the driving disks from the friction wheel and subsequently applying the brake.

4. In a press of the character described, the combination with a friction wheel, driving disks therefor, and a brake for retarding upward movement of the friction wheel, of means for automatically releasing the brake and engaging the driving disks with the friction wheel.

5. In a press of the character described, the combination with a friction wheel, driving disks therefor, and a brake for retarding upward movement of the friction wheel, of means for automatically releasing the brake and subsequently engaging the driving disks with the friction wheel.

6. In a press of the character described, the combination with a friction wheel, driving disks therefor, and a brake for retarding upward movement of the friction wheel, of means for controlling said driving disks and brake so that while one acts upon the friction wheel the other is not acting.

7. In a press of the character described, the combination with a friction wheel, driving disks therefor, and a brake for retarding upward movement of the friction wheel, of means for engaging the driving disks and then applying the brake on the upstroke of the press and for releasing the brake and then engaging the driving disks on the downstroke of the press.

8. In a press of the character described, the combination with a friction wheel, driving disks therefor, a brake for retarding upward movement of the friction wheel, and fluid pressure means for shifting said driving disks and operating said brake, of means for controlling the supply and exhaust of fluid pressure for said shifting and braking.

9. In a press of the character described, the combination with a friction wheel, driving disks therefor, a brake for retarding upward movement of the friction wheel, and fluid pressure means for shifting said driving disks and operating said brake, of means for automatically controlling the supply and exhaust of fluid pressure for said shifting and braking.

10. In a press of the character described, the combination of a friction wheel and driving disks, of a cylinder to which fluid pressure may be supplied for shifting the driving disks, a brake cylinder to which fluid pressure may be supplied for stopping movement of the friction wheel, a valve for controlling the supply and exhaust of fluid pressure for both of said cylinders, means for manually operating said valve to start the friction wheel or stop or reverse it upon its down-stroke, and automatic means for stopping the friction wheel.

11. In a press of the character described, the combination of a friction wheel and driving disks, a cylinder to which fluid pressure may be supplied for shifting the driving disks, a brake cylinder to which fluid pressure may be supplied for stopping movement of the friction wheel, a valve for controlling the supply and exhaust of fluid pressure for both of said cylinders, means for manually operating said valve to start the friction wheel or stop or reverse it upon its down-stroke, and automatic means for reversing the friction wheel at the lower end of its stroke and stopping it at the upper end of its stroke.

12. In a press of the character described, the combination of a friction wheel and driving disks, of a cylinder to which fluid pressure may be supplied for shifting the driving disks, a brake cylinder to which fluid pressure may be supplied for stopping movement of the friction wheel, and a slide valve for controlling the supply and exhaust of fluid pressure for both of said cylinders.

13. In a press of the character described, the combination of a friction wheel and driving disks, of a cylinder to which fluid pressure may be supplied for shifting the driving disks, a brake cylinder to which fluid pressure may be supplied for stopping movement of the friction wheel, and a rotary valve for controlling the supply and exhaust of fluid pressure for both of said cylinders.

14. In a fluid pressure controlled press, a valve, a stud shaft for operating said valve, a lever for rotating the shaft and operating the valve manually, and automatic means for rotating said shaft and operating the valve.

15. In a fluid pressure controlled press, a valve, a stud shaft for operating said valve, a lever for rotating the shaft and operating the valve manually, and a cam for rotating said shaft and operating the valve.

16. In a fluid pressure controlled press having a hammer, a valve for controlling the fluid pressure, a shaft for operating said valve, a slidable cam for rotating said shaft, and means on the hammer for sliding said cam.

17. In a press of the character described, the combination with a friction wheel and driving disks, of a cylinder to which fluid pressure may be supplied for shifting the driving disks, a brake cylinder to which fluid pressure may be supplied for stopping movement of the friction wheel, a valve for controlling the supply and exhaust of fluid pressure to both of said cylinders, and means for automatically operating said valve by movement of the hammer of the press.

18. In a press of the character described, the combination with a friction wheel and driving disks, of a cylinder to which fluid pressure may be supplied for shifting the driving disks, a brake cylinder to which fluid pressure may by supplied for stopping movement of the friction wheel, a valve for controlling the supply and exhaust of fluid pressure to both of said cylinders, and means for both manually and automatically operating said valve.

19. In a press of the character described, the combination with a friction wheel and driving disks, of a cylinder to which fluid pressure may be supplied for shifting the driving disks, a brake cylinder to which fluid pressure may be supplied for stopping movement of the friction wheel, a valve for controlling the supply and exhaust of fluid pressure to both of said cylinders, a slidable cam for operating said valve, and means for sliding said cam from the hammer of the press.

20. In a fluid pressure controlled press having a hammer, a valve at one side of the press for controlling the fluid pressure, a shaft for operating said valve extending through the base of the press, and means at the other side of the press for manually and automatically turning said shaft to operate the valve.

21. In a fluid pressure controlled press having a hammer, a valve at one side of the press for controlling the fluid pressure, a shaft for operating said valve extending through the base of the press, a slidable cam at the other side of the press for turning said shaft to operate the valve, and means on the hammer for sliding said cam.

22. In a fluid pressure controlled press having a hammer, a valve at one side of the press for controlling the fluid pressure, a shaft for operating said valve extending through the base of the press, a slidable cam at the other side of the press for turning said shaft to operate the valve, means on the hammer for sliding said cam, and means for manually turning said shaft independent of said cam.

23. In a fluid pressure controlled press having a hammer, a valve at one side of the press for controlling the fluid pressure, a shaft for operating said valve extending through the base of the press, an arm on said shaft at the other side of the press, a slidable cam for swinging said arm, and means for sliding said cam from the hammer of the press.

24. In a fluid pressure controlled press having a hammer, a valve at one side of the press for controlling the fluid pressure, a shaft for operating said valve extending through the base of the press, an arm on said shaft at the other side of the press, a slidable cam for swinging said arm, means for sliding said cam from the hammer of the press, and means for manually swinging said arm to stop the press independent of said cam.

25. In a press of the character described, the combination with a friction wheel and driving disks, of a cylinder to which fluid pressure may be supplied for shifting the driving disks, a brake cylinder to which fluid pressure may be supplied for stopping movement of the friction wheel, a valve for controlling the supply and exhaust of fluid pressure to both of said cylinders, means for automatically operating said valve, and means for manually operating said valve to stop the press independent of said automatic means.

26. The combination with a press of the character described having driving disks and a brake, of fluid pressure means for operating said driving disks and brake, and an automatic control for said fluid pressure means.

27. The combination with a press of the character described having driving disks and a brake, of fluid pressure means for operating said driving disks and brake, an automatic control for said fluid pressure means, and a manual control for stopping the pressure independent of said said automatic control.

28. In a press of the character described, having a friction wheel and driving disks therefor, rods projecting upward past said friction wheel at a distance apart less than the diameter of the wheel, means connecting said rods above the wheels, and a brake mounted on said connecting means.

29. In a press of the character described, having a friction wheel and driving disks therefor, rods projecting upward past said friction wheel at a distance apart less than the diameter of the wheel and providing bearings for the driving disks shaft, and a brake mounted on said connecting means.

30. In a press of the character described, the combination with a friction wheel, driving disks for said friction wheel, and a shaft for said driving disks, of a fluid pressure cylinder at one end of said shaft, a piston in said cylinder in alinement with said shaft and connected thereto so as to be longitudinally fast and rotatably loose, and means for supplying pressure fluid to said cylinder to engage the driving disks with the friction wheel and disengage them therefrom.

31. In a press of the character described, the combination with a friction wheel, driving disks for said friction wheel, and a shaft for said driving disks, of a fluid pressure cylinder at one end of said shaft, a piston in said cylinder in alinement with said shaft and connected thereto so as to be longitudinally fast and rotatably loose, a spring in said cylinder normally holding the piston so that the raising disk will engage the friction wheel, and means for supplying pressure fluid to said cylinder to engage the driving disks with the friction wheel and disengage them therefrom.

32. In a press having an open frame providing grooves at the inner opposite sides of said opening and forming a die bed at one end of said opening, of a plunger working through the opposite end of said opening, and a hammer on said plunger having tongues adapted to slide in said grooves one of said tongues having a removable section to enable the hammer to be inserted.

33. In a fluid pressure controlled press, a controlling valve, a shaft for operating said valve, an arm on said shaft having rollers in different planes, a slidable cam having projections in the planes of said rollers respectively, and means for sliding said cam from the hammer of the press.

In testimony whereof I have signed this specification in the presence of two subscribing witnesses.

EDMUND W. ZEH.

Witnesses:
 HOWARD P. KING,
 MILDRED E. BROOKS.